(12) United States Patent
Bergstrom et al.

(10) Patent No.: US 6,196,645 B1
(45) Date of Patent: Mar. 6, 2001

(54) MEANS AND METHOD FOR REMOVING DEBRIS FROM THE DRIVE WHEEL OF A TRACK-DRIVEN VEHICLE

(76) Inventors: Brian J. Bergstrom; Janice M. Bergstrom, both of R.R. 2 Box 23, Axtell, NE (US) 68924

( * ) Notice: Subject to any disclaimer, the term of this patent is extended or adjusted under 35 U.S.C. 154(b) by 0 days.

(21) Appl. No.: 09/498,671

(22) Filed: Feb. 7, 2000

Related U.S. Application Data

(63) Continuation of application No. 09/131,541, filed on Aug. 10, 1998, now Pat. No. 6,089,684.

(51) Int. Cl.$^7$ .................................................. B62D 55/088
(52) U.S. Cl. ............................................ 305/110; 305/107
(58) Field of Search ........................ 305/100, 107, 305/110, 115; 172/558, 559, 564, 566, 608, 610; 404/129

(56) References Cited

U.S. PATENT DOCUMENTS

| | | | |
|---|---|---|---|
| 598,206 | 2/1898 | Nightengale | 404/129 |
| 607,014 | 7/1898 | Bostwick | 305/110 X |
| 1,270,725 | 6/1918 | Gratton | 404/129 |
| 2,582,199 | 1/1952 | Gardner et al. | 172/554 X |
| 3,861,762 | 1/1975 | Freedy et al. | 305/12 |
| 3,976,337 | 8/1976 | Vaughn | 305/12 |
| 4,134,622 | 1/1979 | Krolak et al. | 305/12 |
| 4,235,479 | 11/1980 | Puglise | 305/12 |
| 4,531,787 | 7/1985 | Hart et al. | 305/12 |
| 4,763,961 | 8/1988 | Parrott | 305/12 |
| 4,818,040 | 4/1989 | Mezzancella et al. | 305/12 |
| 4,830,439 | 5/1989 | Collins et al. | 305/11 |
| 5,226,703 | 7/1993 | Norman | 305/12 |
| 5,443,125 | 8/1995 | Clark et al. | 172/608 |
| 5,451,100 | 9/1995 | Freeman | 305/12 |
| 5,725,292 | 3/1998 | Keedy et al. | 305/107 X |

FOREIGN PATENT DOCUMENTS

| | | | |
|---|---|---|---|
| 245847 | 11/1987 | (EP) | 305/100 |
| 2124568 | 2/1984 | (GB) | 305/100 |

*Primary Examiner*—Russell D. Stormer
(74) *Attorney, Agent, or Firm*—Zarley, McKee, Thomte, Voorhees & Sease; Dennis L. Thomte

(57) ABSTRACT

A device for removing debris from a drive wheel rotatably mounted to a vehicle body includes an auxiliary wheel rotatably mounted on the body adjacent an outer peripheral surface of the drive wheel. The auxiliary drive wheel has a substantially circumferential surface for engaging the outer peripheral surface of the drive wheel and thereby being rotated by the drive wheel in a direction opposite the rotation of the drive wheel. The auxiliary wheel dislodges debris on the drive wheel and discharges it away from the track mechanism of the vehicle. A selector mechanism can be provided to selectively move the auxiliary wheel out of engagement with the drive wheel. The auxiliary wheel can be mounted radially adjacent to the drive wheel so that it contacts the upper section of the drive wheel. This device allows a method of removing debris from a rotating drive wheel by mounting a debris gathering wheel adjacent the drive wheel and bringing the rotatable debris gathering wheel into frictional contact with the drive wheel so as to remove debris from the drive wheel.

2 Claims, 5 Drawing Sheets

MEANS AND METHOD FOR REMOVING DEBRIS FROM THE DRIVE WHEEL OF A TRACK-DRIVEN VEHICLE

CROSS-REFERENCE TO RELATED APPLICATION

This is a continuation application of Petitioners' earlier application Ser. No. 09/131,541 filed Aug. 10, 1998 and now U.S. Pat. No. 6,089,684, entitled MEANS AND METHOD FOR REMOVING DEBRIS FROM THE DRIVE WHEEL OF A TRACK-DRIVEN VEHICLE.

BACKGROUND OF THE INVENTION

1. Field of the Invention

The present invention relates to the field of vehicles driven by continuous loop tracks. More particularly, this invention relates to a means and method for removing debris from the drive wheels of such track-driven vehicles.

2. Description of the Related Art

During recent years, the agricultural industry in the United States has seen an explosion in new technology aimed at reducing compaction in the fields. Track-driven tractors are rapidly gaining acceptance as alternatives to traditional wheeled tractors in order to reduce compaction. Although these track-driven tractors solved many of the problems of their wheeled counterparts, they present some disadvantages of their own.

One common obstacle to track efficiency is the buildup of cornstalks and other field debris in the power trains of the tractors. This impairs efficiency and produces premature wear on the power train and belt or track. Farmers currently remedy this situation by stopping the tractor and removing the chaff manually, which results in significant downtime. Manufacturers of track-driven tractors have been actively searching for a solution to this problem. One manufacturer has installed permanent, rigidly mounted shields to block the flow of chaff. However, these shields merely create a new area in which debris can be lodged. Other solutions have typically involved the use of a stationary blade which is mounted so as to engage the drive wheel. These stationary scraper blades or bars tend to clog, wear, require adjustment over time, and may present serious pinch hazards.

Therefore, there is a need for an improved means and method for removing debris from the drive wheel of a track-driven vehicle.

SUMMARY OF THE INVENTION

A device for removing debris from a tracked drive wheel rotatably mounted on a vehicle body and including an auxiliary wheel rotatably mounted on the body adjacent an outer peripheral surface of the drive wheel. The auxiliary wheel has a substantially circumferential surface for engaging the outer peripheral surface of the drive wheel and is rotated by the drive wheel in a direction opposite the direction of the drive wheel. The engagement of the auxiliary wheel with the drive wheel causes debris on the drive wheel to be dislodged therefrom and discharged away from the track mechanism of the vehicle. A selector mechanism can be provided to selectively move the auxiliary wheel out of engagement with the drive wheel. The auxiliary wheel can be mounted radially adjacent to the drive wheel so that it contacts the upper section of the drive wheel. This device makes possible a method of removing debris from a rotating tracked drive wheel which includes the steps of mounting a debris gathering wheel adjacent the drive wheel and bringing the rotatable debris gathering wheel into frictional contact with the drive wheel so as to remove debris from the drive wheel.

The auxiliary wheel can be mounted in a variety of different configurations so as to constantly or selectively engage the drive wheel.

Thus, a primary objective of the present invention is the provision of a means and method for removing debris from the drive wheel of a track-driven vehicle.

Another objective of the present invention is the provision of a self-adjusting device for removing debris from the drive wheel of a track-driven vehicle.

Another objective of the present invention is the provision of a debris removing device which is mounted radially adjacent to the drive wheel.

Another objective of the present invention is the provision of a debris removing device which frictionally engages the drive wheel and is rotated thereby.

Another objective of the present invention is the provision of a method of removing debris from the drive wheel of a track-driven vehicle wherein a debris gathering wheel is rotatably mounted on the vehicle adjacent the drive wheel and brought into engagement therewith.

Another objective of the present invention is the provision of a debris gathering wheel that has a resiliently deformable outer layer thereon for engaging the drive wheel to remove debris therefrom.

Another objective of the present invention is the provision of a device which is easily retrofitted on existing track-driven vehicles.

Another objective of the present invention is the provision of a debris removing device which is economical to manufacture, durable in use, and reliable.

These and other objectives will be apparent from the drawings, as well as from the description and claims which follow.

DETAILED DESCRIPTION OF THE PREFERRED EMBODIMENTS

Figure 1:
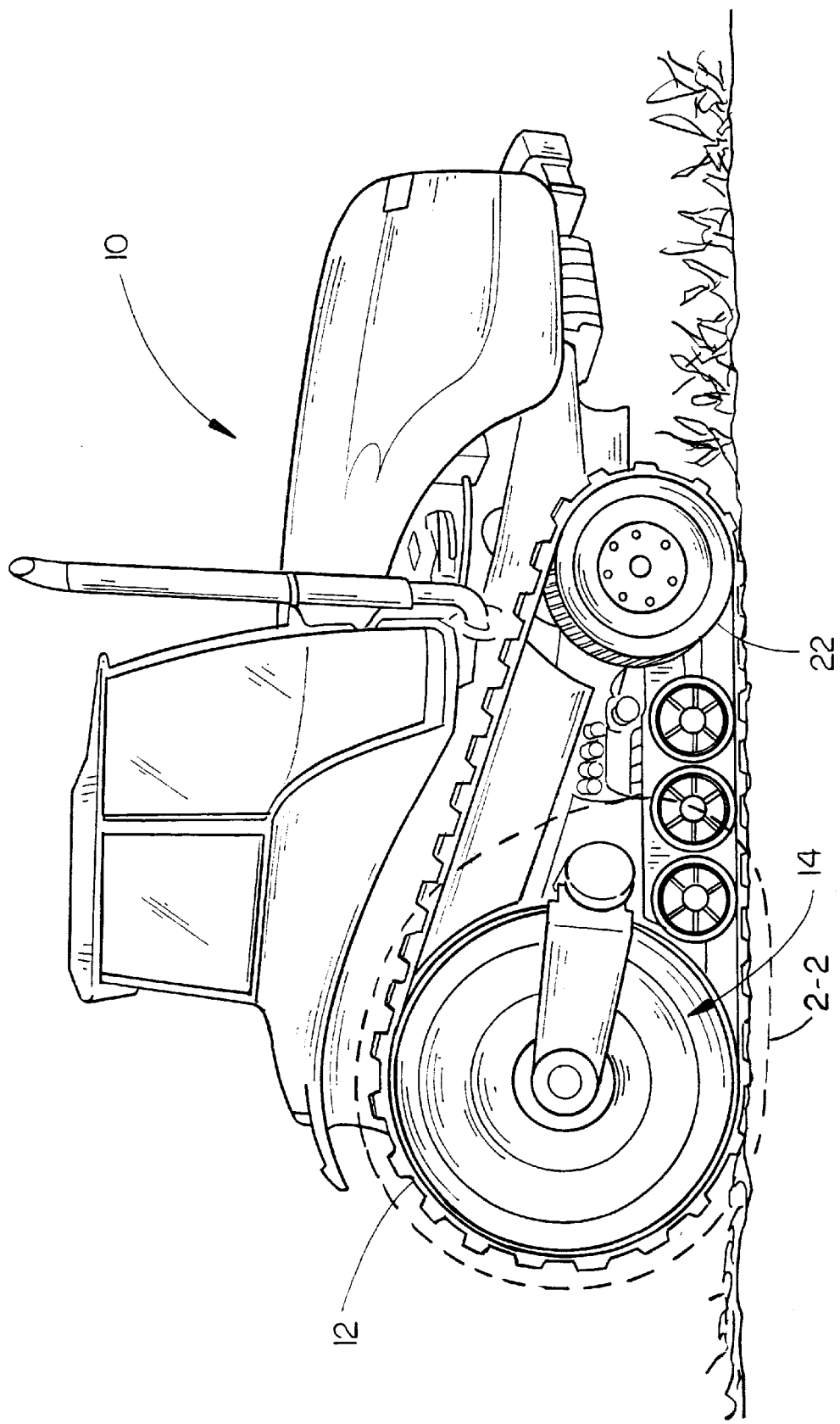
FIG. 1 is a perspective view of a track-driven vehicle equipped with the present invention.

In FIG. 1, a track-driven tractor is designated by the reference numeral 10. The tractor 10 has at least one flexible, continuous loop track 12 at each side thereof which engage the ground for propulsion. The tracks 12 are generally made of a rubber-based material. A drive wheel assembly 14 drivingly engages the track 12 at each side of the tractor 10. A conventional manner by a conventional engine (not shown) drives the drive wheel assembly 14 in a known manner.

Figure 2:
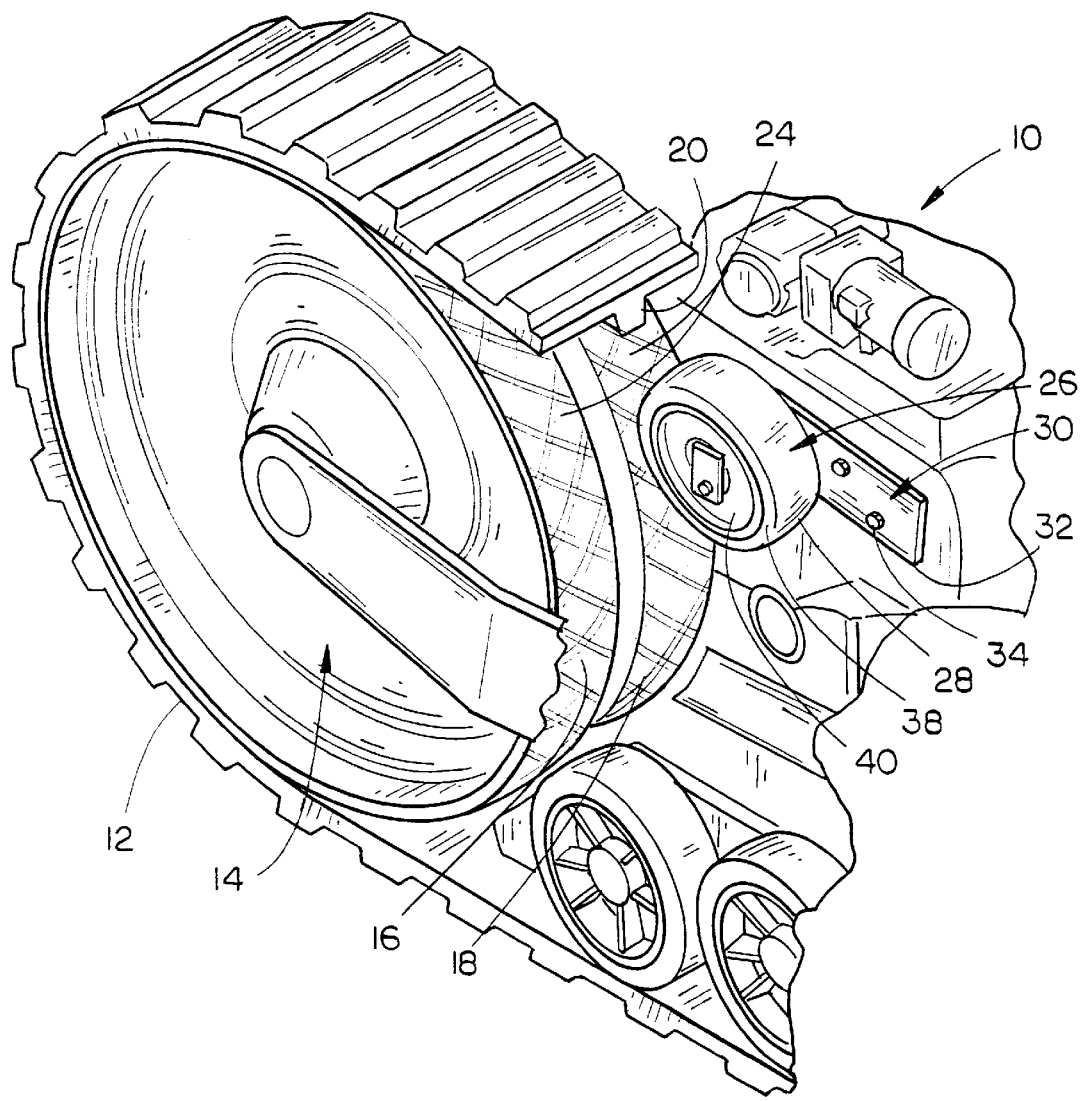
FIG. 2 is a perspective view of the area designated 2—2 in FIG. 1. The guards have been removed for clarity.
Figure 3:
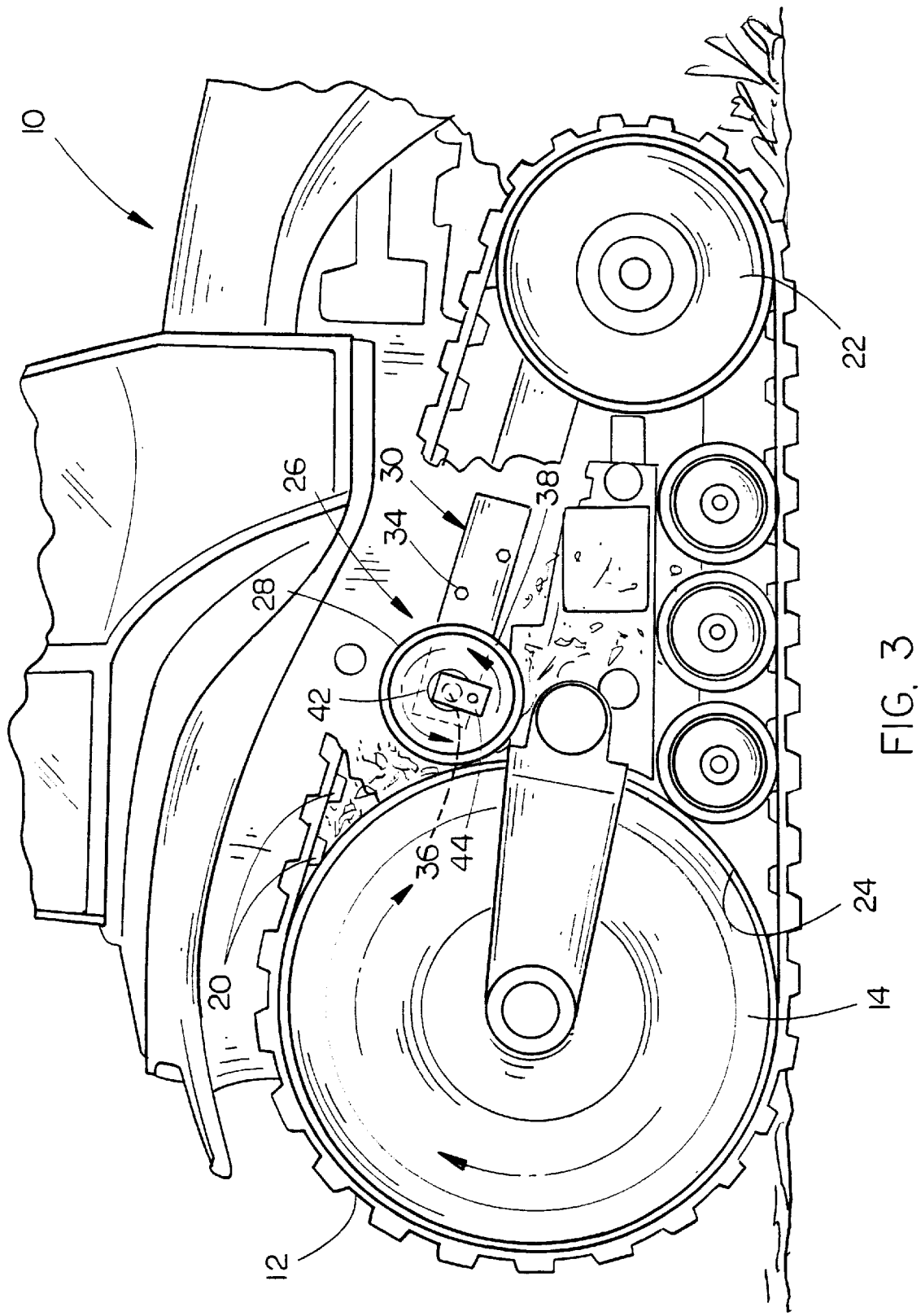
FIG. 3 is a right elevation view of the vehicle of FIG. 1 and illustrates the operation of the debris removing device.
Figure 4:
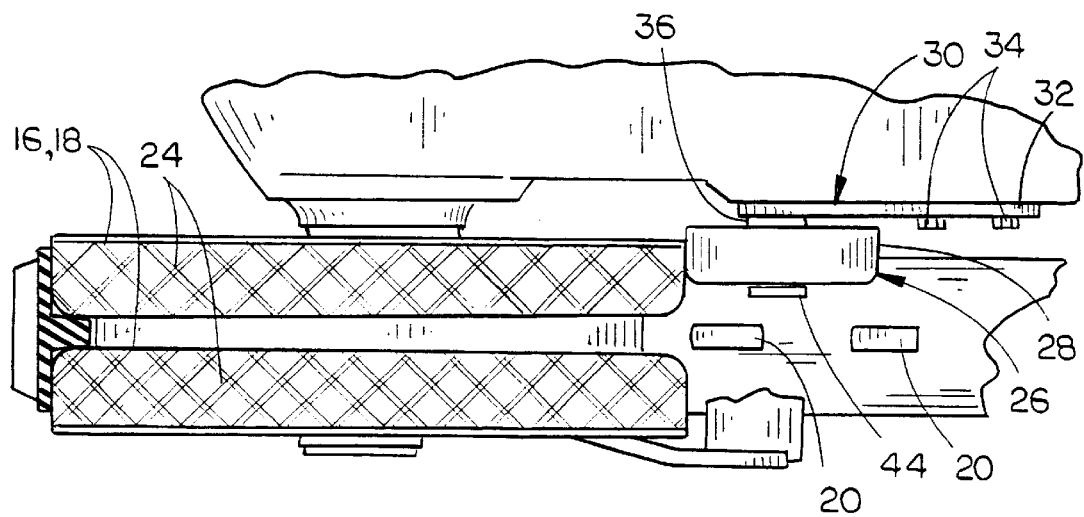
FIG. 4 is a top plan view of the drive wheel area.
Figure 5:
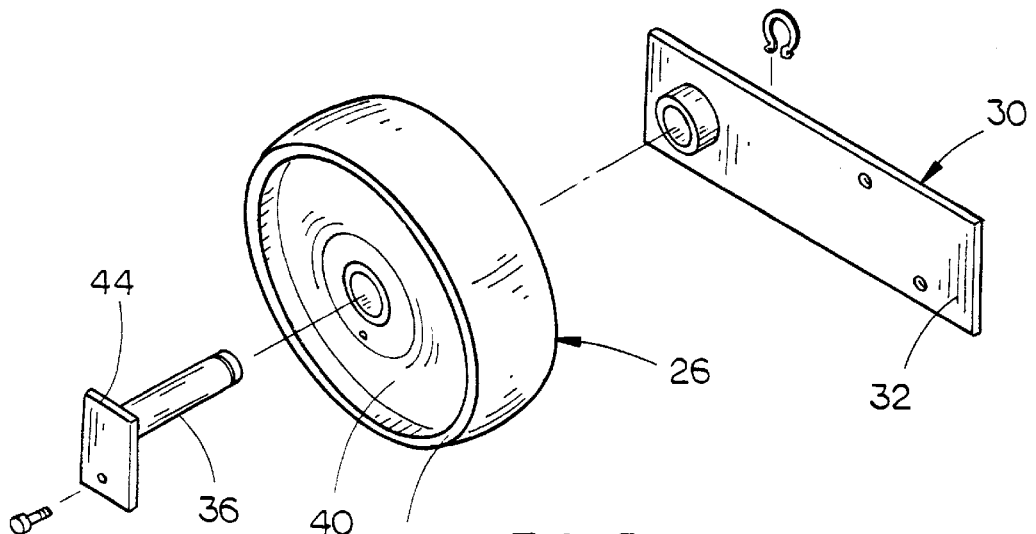
FIG. 5 is an exploded perspective view of the auxiliary or debris removing wheel assembly of this invention.

As best seen in FIG. 2, the drive wheel assembly 14 includes a pair of laterally spaced drive wheels 16, 18 on each side of the tractor 10. A plurality of longitudinally spaced teeth 20 protrude downwardly from the underside of the track 12 and are tapered so as to fit frictionally between the drive wheels 16, 18. Although the drawings illustrate a pair of drive wheels 16 and 18, a single drive wheel, having a groove formed in the periphery thereof, could be used. As seen in FIG. 3, the teeth 20 extend linearly along the track 12. The teeth 20 are tapered in a direction perpendicular to the drive wheels 16, 18, as well as being tapered longitudinally. The teeth 20 keep the track 12 in its proper position on the drive wheels 16, 18. Referring again to FIG. 1, a front drive wheel 22 is longitudinally spaced in front of the rear drive wheels 16, 18 so as to maintain the proper tension on the track or belt 12. All of the structure described thus far is conventional.

FIG. 2 shows the area adjacent the drive wheels 16, 18 in greater detail. The guards shown in FIG. 1 have been removed in FIG. 2 for clarity. The drive wheels 16, 18 are rotatably mounted to the body of the vehicle or tractor 10. The drive wheels 16, 18 each have an outer peripheral surface for engaging the substantially flat underside of the track 12 on opposite sides of the teeth 20. Preferably, the outer peripheral surface 24 of the drive wheels 16, 18 comprises a substantially planar circumferential surface. An auxiliary or debris removing wheel 26 is rotatably mounted adjacent the outer peripheral surface 24 of one or more of the drive wheels 16, 18. The auxiliary wheel 26 has a substantially planar outer circumferential surface 28 which engages the outer peripheral surface 24 of the drive wheel 16, 18.

In the simplest embodiment shown in FIGS. 2–5, an elongated mounting arm 30 mounts the auxiliary wheel 26 to the body of the tractor 10. The mounting arm 30 has one end 32 rigidly attached or fixed to the body of the tractor by a plurality of conventional fasteners 34. The other end of the mounting arm 30 is free, and the auxiliary wheel 26 is rotatably mounted thereon. The wheel 26 mounts on an axle member 36 which is cantilevered to the arm 30. The auxiliary wheel 26 has a layer of spongy or resiliently deformable tread 38 extending around a rigid hub 40. The tread 38 can be formed of a rubber-based material. The layer of tread 38 is substantially planar and extends circumferentially around the hub 40 so as to engage the circumferential surface of the drive wheel 16, 18. The hub 40 is substantially rigid and has a central opening 42 extending horizontally therethrough for journaling the axle member 36. A retaining member 44 extends radially outward from the free end of the axle member 36 so as to limit the movement of the auxiliary wheel 26 away from the body.

In use, the debris removing wheel 26 mounts adjacent the drive wheel 16, 18 of the tractor 10, as shown in FIG. 3. The debris gathering wheel 26 is in frictional contact with the drive wheel 16, 18. Preferably, the tread layer 38 is approximately one inch thick, but is compressible to approximately one-half inch thick when it contacts the drive wheel 16, 18. This contact causes the auxiliary or debris removing wheel 26 to rotate in an opposite direction than the drive wheel 16, 18 (as indicated by the arrows). As debris, which is being carried by the drive wheel 16, 18, contacts the tread layer 38 of the auxiliary wheel 26, the debris is separated from the drive wheel 16, 18 and thrown downwardly and clear of the track 12 by the auxiliary wheel 26. Thus, the auxiliary wheel 26 effectively removes debris from the drive wheel 16,18. The auxiliary wheel 26 is preferably mounted radially adjacent to the drive wheel 16, 18 and engages the upper portion thereof. At the point of engagement, the debris is transferred from the drive wheel 16, 18 to the debris gathering wheel 26. Once the portion of the debris gathering wheel 26 having the debris transferred thereto has rotated past engagement with the drive wheel 16, 18, gravity discharges the debris downwardly. The centrifugal force generated by the auxiliary wheel 26 may also assist in discharging of the debris.

Figure 6:
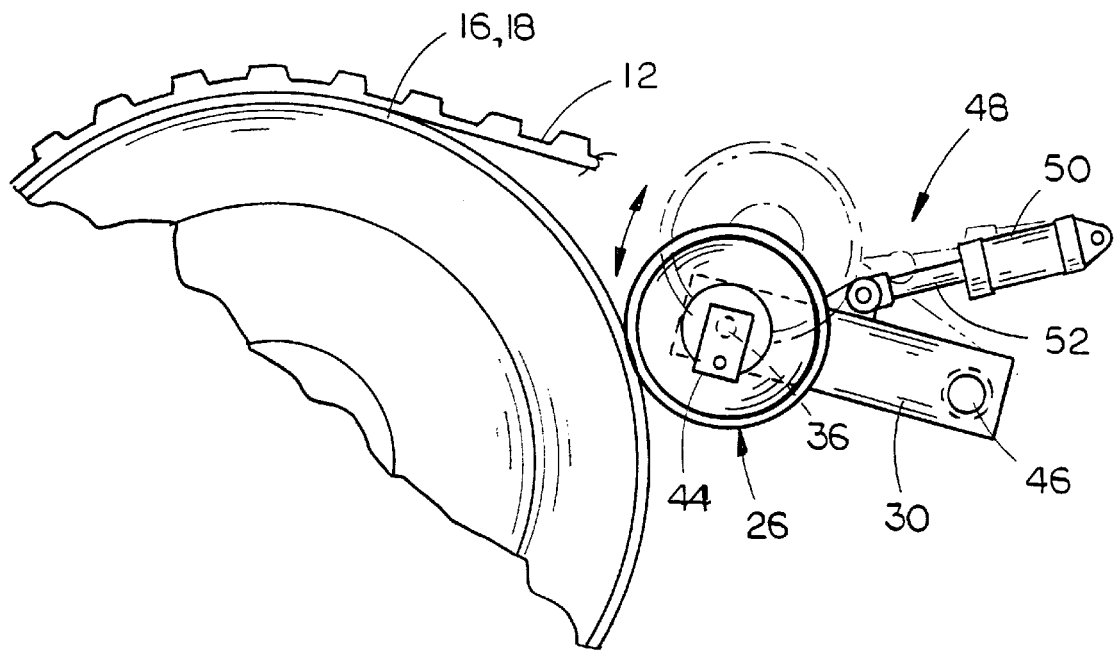
FIG. 6 is a right elevation view of the drive wheel area showing a pivotal hydraulically operated embodiment of the selector mechanism.

In another embodiment of the invention shown in FIG. 6, the mounting arm 30 is pivotally mounted to the body of the tractor 10 by a pin 46. A selector mechanism 48 is attached to the free end of the mounting arm 30. Here, the selector mechanism 48 is shown to be a hydraulic cylinder 50 with a ram 52. However, electrical or mechanical means can also be used without detracting from the invention. The selector mechanism 48 moves the auxiliary wheel 26 into and out of contact with the upper section of the drive wheel 16, 18. Thus, the auxiliary wheel 26 can be moved into engagement with the drive wheel 16, 18 as desired.

Figure 7:
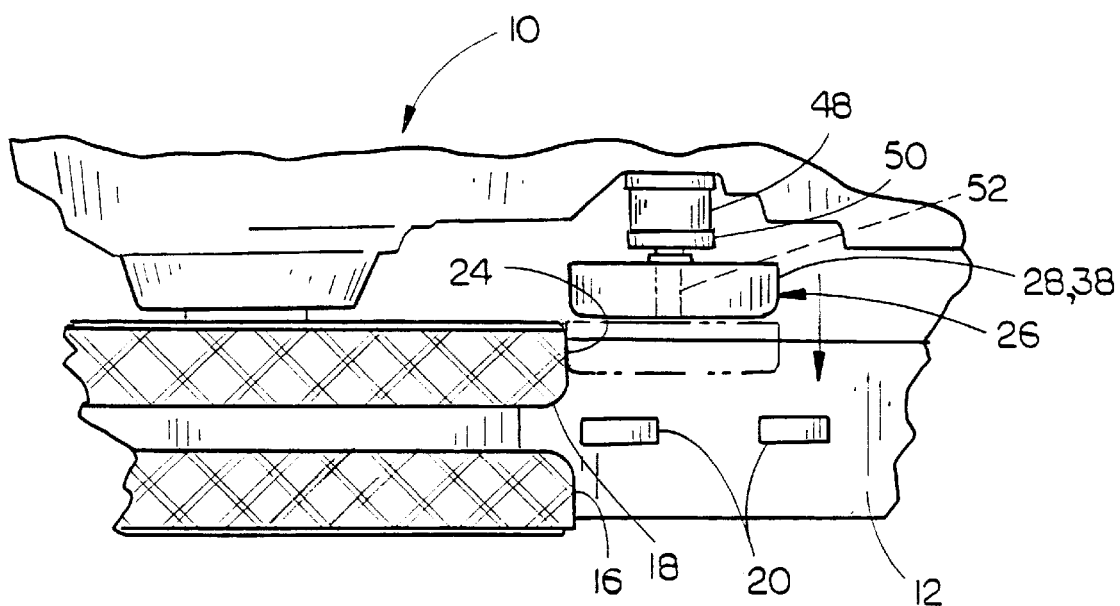
FIG. 7 is a top plan view of the drive wheel area showing an axially movable embodiment of the selector mechanism.

Another embodiment is shown in FIG. 7. A hydraulic cylinder 50 has a movable ram 52 extending therefrom which moves the auxiliary wheel 26 axially along the axle member 36. When the ram 52 is retracted, the auxiliary wheel 26 is retracted from the drive wheel 16, 18. When extended, the ram 52 pushes the wheel 26 into engagement with the drive wheel 16, 18. Again, the auxiliary or debris removing wheel 26 engages the upper section of the drive wheel 16, 18.

In the drawings and specification, there has been set forth a preferred embodiment of the invention and although specific terms are employed, these are used in a generic and descriptive sense only and not for purposes of limitation. Changes in the form and the proportion of parts, as well as in the substitution of equivalents, are contemplated as circumstances may suggest or render expedient without departing from the spirit or scope of the invention as further defined in the following claims.

We claim:

1. A device for removing debris from a drive wheel of a vehicle propelled by a continuous loop ground-engaging track, said drive wheel having an outer peripheral surface, rotatably mounted to a body of a vehicle, comprising:

an elongated mounting arm having first and second ends;

said first end of said mounting arm being rigidly fixed to the vehicle body inwardly of and adjacent to the drive wheel thereof;

an auxiliary wheel rotatably mounted on said mounting arm so as to be positioned adjacent the outer peripheral surface of the drive wheel, said auxiliary wheel having a substantially circumferential surface for frictionally engaging the outer peripheral surface of the drive wheel and thereby being rotated by the drive wheel in a second direction opposite a first direction in which the drive wheel rotates;

said engagement of the auxiliary wheel with the drive wheel causing debris on the drive wheel to be dislodged from the drive wheel;

said auxiliary wheel having a resiliently deformable outer circumference for resilient frictional engagement with the drive wheel.

2. The device of claim 1 wherein the drive wheel has upper and lower sections, the auxiliary wheel engaging the upper section of the drive wheel.

\* \* \* \* \*